US012664349B2

(12) United States Patent
Mochizuki

(10) Patent No.: US 12,664,349 B2
(45) Date of Patent: Jun. 23, 2026

(54) INFORMATION PROCESSING SYSTEM AND METHOD FOR DISPLAYING DIGITAL DOCUMENTS ASSOCIATED WITH SEARCH CONDITIONS

(71) Applicant: FUJIFILM BUSINESS INNOVATION CORP., Tokyo (JP)

(72) Inventor: Masanari Mochizuki, Yokohama (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/874,505

(22) Filed: Jul. 27, 2022

(65) Prior Publication Data

US 2023/0315973 A1 Oct. 5, 2023

(30) Foreign Application Priority Data

Mar. 29, 2022 (JP) ................................. 2022-053338

(51) Int. Cl.
*G06F 40/106* (2020.01)
*G06F 3/04812* (2022.01)
*G06F 16/93* (2019.01)

(52) U.S. Cl.
CPC ........ *G06F 40/106* (2020.01); *G06F 3/04812* (2013.01); *G06F 16/93* (2019.01); *G06F 2203/04805* (2013.01)

(58) Field of Classification Search
CPC .... G06F 40/106; G06F 16/93; G06F 3/04812; G06F 2203/04805; G06F 16/951; G06F 16/338; G06F 16/54

(Continued)

(56) References Cited

U.S. PATENT DOCUMENTS

| | | | | |
|---|---|---|---|---|
| 7,739,622 | B2 * | 6/2010 | DeLine | ............... G06F 3/04855 345/670 |
| 2005/0257400 | A1 * | 11/2005 | Sommerer | ............ G06F 16/954 36/13 |

(Continued)

FOREIGN PATENT DOCUMENTS

| | | | |
|---|---|---|---|
| JP | 2009169538 A | 7/2009 | |
| JP | 5345049 B2 | 11/2013 | |
| WO | 2012039054 A1 | 3/2012 | |

OTHER PUBLICATIONS

Jun Tanaka, "Electronic Document Management Device, Electronic Document Management System, And Electronic Document Management Program", published on May 26, 2016, Document ID: WO-2016080029-A1, pp. 12 (Year: 2016).*

(Continued)

*Primary Examiner* — Chau T Nguyen
(74) *Attorney, Agent, or Firm* — Oliff PLC

(57) ABSTRACT

An information processing system includes a processor configured to: extract, among one or more pages forming each of plural digital documents which are obtained as results of conducting a search by using a specified search condition, a predetermined page which is preset for each of the plural digital documents; perform control to generate a first image representing a set of the extracted predetermined pages of the respective digital documents and to display the first image on a display; and perform control, in response to a first input operation performed on the first image by a user, to display a second image, which represents the extracted predetermined pages, in an enlarged size on the display so that a display size of the second image becomes larger than a display size of the first image.

19 Claims, 13 Drawing Sheets

(58) Field of Classification Search
    USPC .......................................................... 715/838
    See application file for complete search history.

(56)                        References Cited

U.S. PATENT DOCUMENTS

| | | | | |
|---|---|---|---|---|
| 2008/0104535 A1* | 5/2008 | DeLine | ................. | G06F 3/0483 |
| | | | | 715/785 |
| 2008/0134093 A1* | 6/2008 | Dharmarajan | ........ | G06F 16/338 |
| | | | | 715/838 |
| 2012/0136892 A1* | 5/2012 | Ajima | ................... | G06F 16/951 |
| | | | | 707/769 |
| 2012/0323891 A1* | 12/2012 | Jacobson | ................ | G06F 16/48 |
| | | | | 707/E17.014 |
| 2013/0305150 A1 | 11/2013 | Budavari | | |
| 2013/0311949 A1 | 11/2013 | Shimadate | | |
| 2016/0034430 A1* | 2/2016 | Beavers | ................ | G06F 3/0483 |
| | | | | 715/205 |
| 2019/0005616 A1* | 1/2019 | de la Fuente | ......... | G06F 40/169 |
| 2023/0306190 A1* | 9/2023 | Watanabe | ............. | G06F 40/194 |

OTHER PUBLICATIONS

May 16, 2023 Search Report issued in European Patent Application No. 22192970.6.
Jan. 27, 2026 Office Action issued in Japanese Patent Application No. 2022-053338.

\* cited by examiner

Figure 3:
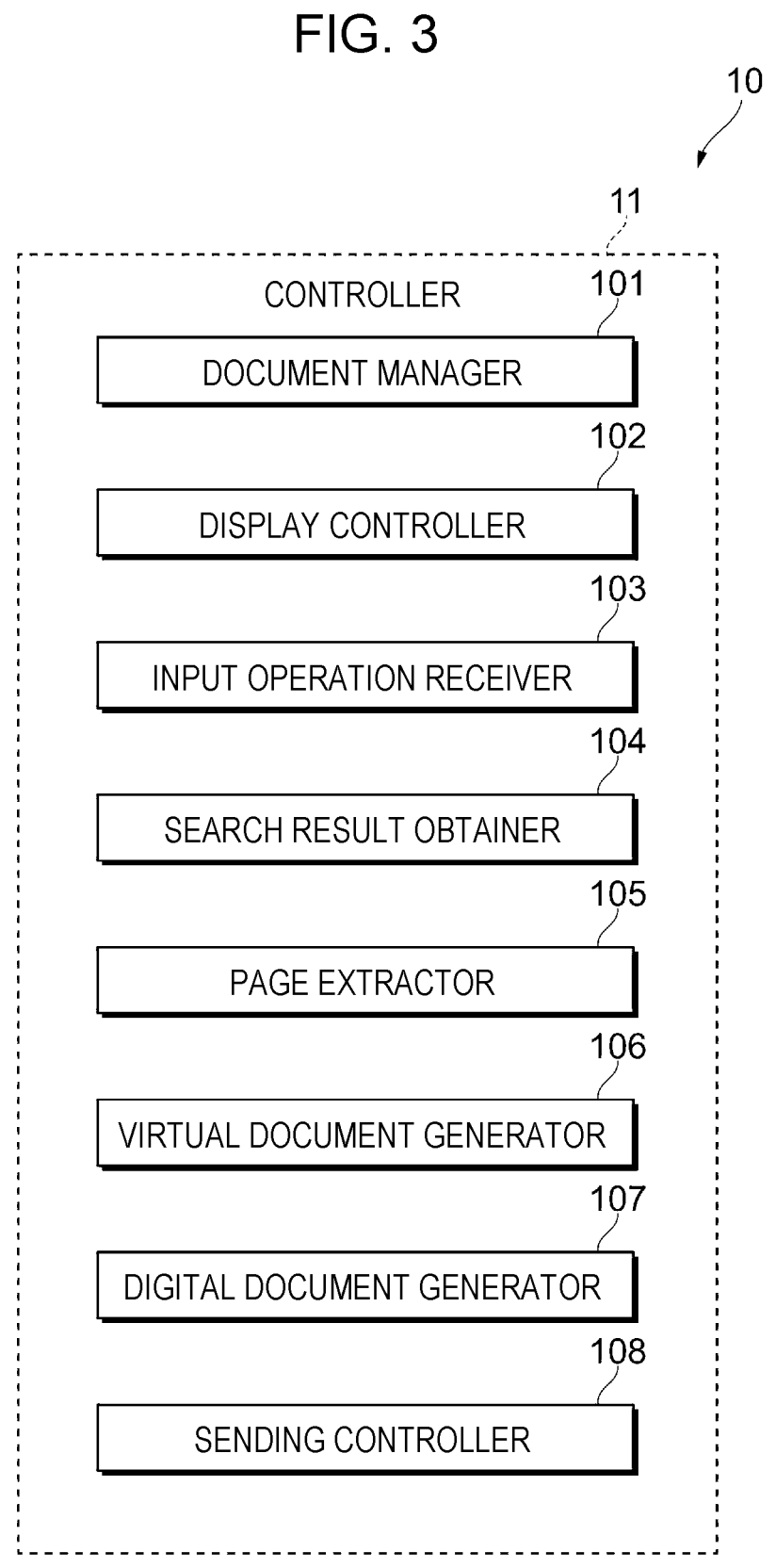

CONTROLLER

101
DOCUMENT MANAGER

102
DISPLAY CONTROLLER

103
INPUT OPERATION RECEIVER

104
SEARCH RESULT OBTAINER

105
PAGE EXTRACTOR

106
VIRTUAL DOCUMENT GENERATOR

107
DIGITAL DOCUMENT GENERATOR

108
SENDING CONTROLLER

30

CONTROLLER        301

DOCUMENT MANAGER

302

DISPLAY CONTROLLER

303

INPUT INFORMATION RECEIVER

304

SEARCH RESULT OBTAINER

305

PAGE EXTRACTOR

306

VIRTUAL DOCUMENT GENERATOR

307

DIGITAL DOCUMENT GENERATOR

308

SENDING CONTROLLER

INFORMATION PROCESSING SYSTEM AND METHOD FOR DISPLAYING DIGITAL DOCUMENTS ASSOCIATED WITH SEARCH CONDITIONS

CROSS-REFERENCE TO RELATED APPLICATIONS

This application is based on and claims priority under 35 USC 119 from Japanese Patent Application No. 2022-053338 filed Mar. 29, 2022.

BACKGROUND

(i) Technical Field

The present disclosure relates to an information processing system and method and a non-transitory computer readable medium.

(ii) Related Art

A technology for displaying multiple digital documents obtained as search results as a list of thumbnail images is known (see Japanese Patent No. 5345049, for example).

SUMMARY

According to this technology, to find a target digital document from multiple digital documents obtained as search results, a user is required to select thumbnail images in the list one by one and to open the pages of each digital document.

Aspects of non-limiting embodiments of the present disclosure relate to enabling a user to identify the content of each of multiple digital documents obtained as search results with a simple operation, compared with the configuration in which a user selects each of thumbnail images of digital documents displayed in a list of search results and opens the pages of each digital document.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing system including a processor configured to: extract, among one or more pages forming each of plural digital documents which are obtained as results of conducting a search by using a specified search condition, a predetermined page which is preset for each of the plural digital documents; perform control to generate a first image representing a set of the extracted predetermined pages of the respective digital documents and to display the first image on a display; and perform control, in response to a first input operation performed on the first image by a user, to display a second image, which represents the extracted predetermined pages, in an enlarged size on the display so that a display size of the second image becomes larger than a display size of the first image.

BRIEF DESCRIPTION OF THE DRAWINGS

An exemplary embodiment of the present disclosure will be described in detail based on the following figures, wherein:

FIG. 3 is a block diagram illustrating the functional configuration of a controller of the user terminal;

DETAILED DESCRIPTION

An exemplary embodiment of the disclosure will be described below in detail with reference to the accompanying drawings.

Configuration of Information Processing System

Figure 1:
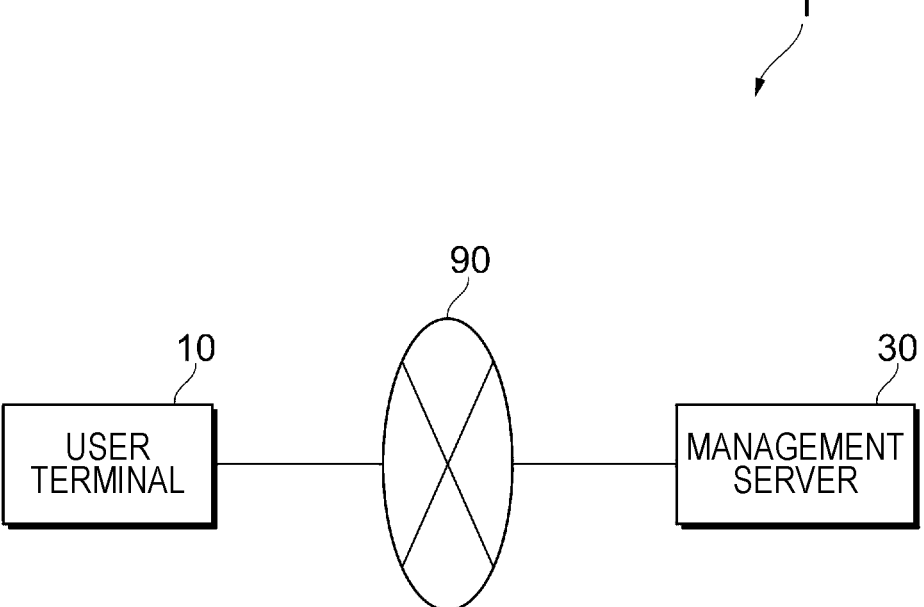
FIG. 1 illustrates an example of the overall configuration of an information processing system according to the exemplary embodiment.

FIG. 1 illustrates an example of the overall configuration of an information processing system 1 according to the exemplary embodiment.

The information processing system 1 includes a user terminal 10 and a management server 30 connected to each other via a network 90. Examples of the network 90 are a local area network (LAN) and the internet.

The user terminal 10 is an information processing apparatus, such as a personal computer, a smartphone, and a tablet terminal operated by a user. The user terminal 10 displays an operation screen on a display 16 (see FIG. 2) using so-called file handling software. Hereinafter, such an operation screen will be called a workspace. Plural workspaces may be created and be each displayed on the display 16 in response to a user input operation. A user can share a workspace with another user via the network 90.

The user terminal 10 displays a thumbnail image of a digital document to be handled by a user in a workspace. The thumbnail image of a digital document is a shortcut and the digital document itself is stored in a database, such as a digital document database (DB) 131 shown in FIG. 2, which will be discussed later. The type of digital document stored in a database is not restricted to a particular type and may be a text document created by document creation application software, for example.

The user terminal 10 displays a user interface on the display 16. This user interface can receive an input operation for searching through one or more digital documents represented as one or more thumbnail images displayed in each of one or more workspaces. Hereinafter, this user interface will be called a search user interface. The user terminal 10 conducts a search by using a search condition specified by an input operation on the search user interface and obtains one or more pages forming each of one or more digital documents as search results. The user terminal 10 then extracts a predetermined page of each digital document or a set of predetermined pages of respective digital documents from the search results.

The user terminal 10 also generates a thumbnail image of a virtual digital document (hereinafter simply called a virtual document) representing a set of one or more predetermined pages obtained as results of a search which is conducted by using a search condition specified by a user, and then displays the generated thumbnail image of the virtual document on the search user interface. The user terminal 10 also displays, together with the generated thumbnail image of the virtual document, identification information for identifying each of one or more predetermined pages forming the virtual document on the search user interface so that the identification information can be selected.

In response to an input operation for selecting the thumbnail image of the virtual document displayed on the search user interface, the user terminal 10 displays a preview image of one or more predetermined pages forming the virtual document in an enlarged size so that the size of the preview image becomes larger than that of the thumbnail image of the virtual document. In response to an input operation for switching between the pages of the preview image of one or more predetermined pages forming the virtual document, the user terminal 10 sequentially displays the individual pages of the preview image of one or more predetermined pages.

In response to an input operation for selecting one of the items of information for identifying one or more predetermined pages forming the virtual document, the user terminal 10 displays, on the search user interface, a preview image of the predetermined page identified by the selected item of information in an enlarged size so that the display size of the preview image becomes larger than that of the thumbnail image of the virtual document.

A virtual document may be stored in response to a user input operation. More specifically, in response to an input operation for storing a virtual document displayed as a thumbnail image on the search user interface, the user terminal 10 stores the virtual document in a database by linking the thumbnail image of the digital document and a search condition used for conducting a search with the virtual document and manages the stored virtual document. "Storing a virtual document" refers to two cases: one case in which a search condition is stored and the other case in which a search result is stored.

If a search condition is stored, every time an operation for selecting a virtual document is performed, another search is conducted with the search condition linked with the virtual document, and a preview image of one or more predetermined pages is displayed in an enlarged size as search results. That is, a search result at a time point at which a virtual document is selected is displayed in an enlarged size. Search results may be "0 results" depending on the timing at which a virtual document is selected. In this case, a user is informed that no results are obtained.

In contrast, if a search result is stored, a search result at a time point at which a virtual document is selected is stored. In this case, the search result is stored as a regular digital document. More specifically, in response to an input operation for storing, as a regular digital document, a virtual document displayed on the search user interface as a thumbnail image, the user terminal 10 generates a digital document constituted by one or more predetermined pages extracted as the search results. The user terminal 10 then stores the generated digital document in a database by linking the search condition used for a search and information indicating the time point of the search with the digital document and manages the stored digital document. Details of this processing to be executed by the user terminal 10 will be discussed later.

The management server 30 is an information processing apparatus as a server that manages the entirety of the information processing system 1. The management server 30 is able to execute at least part of the above-described processing executed by the user terminal 10. For example, the management server 30 may perform control to display a workspace on the display 16 of the user terminal 10 and to display a thumbnail image of a digital document in a workspace. The management server 30 may also perform control to display a search user interface on the display 16 of the user terminal 10.

The management server 30 may also execute processing for searching through digital documents by using a search condition specified by a user and for extracting, from one or more pages forming each of one or more digital documents obtained as search results, a predetermined page of each digital document. The management server 30 may also execute processing for generating a thumbnail image of a virtual document and for displaying the generated thumbnail image of the virtual document on the search user interface.

The management server 30 may also perform control to display, on the search user interface, a preview image of one or more predetermined pages forming a virtual document in an enlarged size so that the size of the preview image becomes larger than that of the thumbnail image of the virtual document. The management server 30 may also perform control, in response to an input operation on the preview image of one or more predetermined pages forming the virtual document, to sequentially display the individual pages of the preview image.

The management server 30 may also perform control, upon receiving an input operation on a thumbnail image of a digital document by the user terminal 10, to display a preview image of a predetermined page of one or more pages forming the digital document in an enlarged size on the search user interface so that the size of the preview image becomes larger than that of the thumbnail image of the digital document.

Details of these processing operations executed by the management server 30 will be discussed later.

The above-described configuration of the information processing system 1 is only an example. The information processing system 1 may be configured in any manner if it has functions that implement the above-described processing operations as a whole. All or some of these functions may be distributed over the user terminal 10 and the management server 30 in the information processing system 1 or may be performed by the user terminal 10 and the management server 30 in collaboration with each other. That is, as discussed above, all or some of the functions of the user terminal 10 may be replaced by the corresponding functions of the management server 30. Conversely, all or some of the functions of the management server 30 may be replaced by the corresponding functions of the user terminal 10. All or some of the functions of the user terminal 10 and all or some of the functions of the management server 30 may be delegated to another device, such as another server, which is not shown. This can facilitate processing in the overall information processing system 1 or enables devices in the information processing system 1 to execute processing operations by complementing each other.

Hardware Configuration of User Terminal

Figure 2:
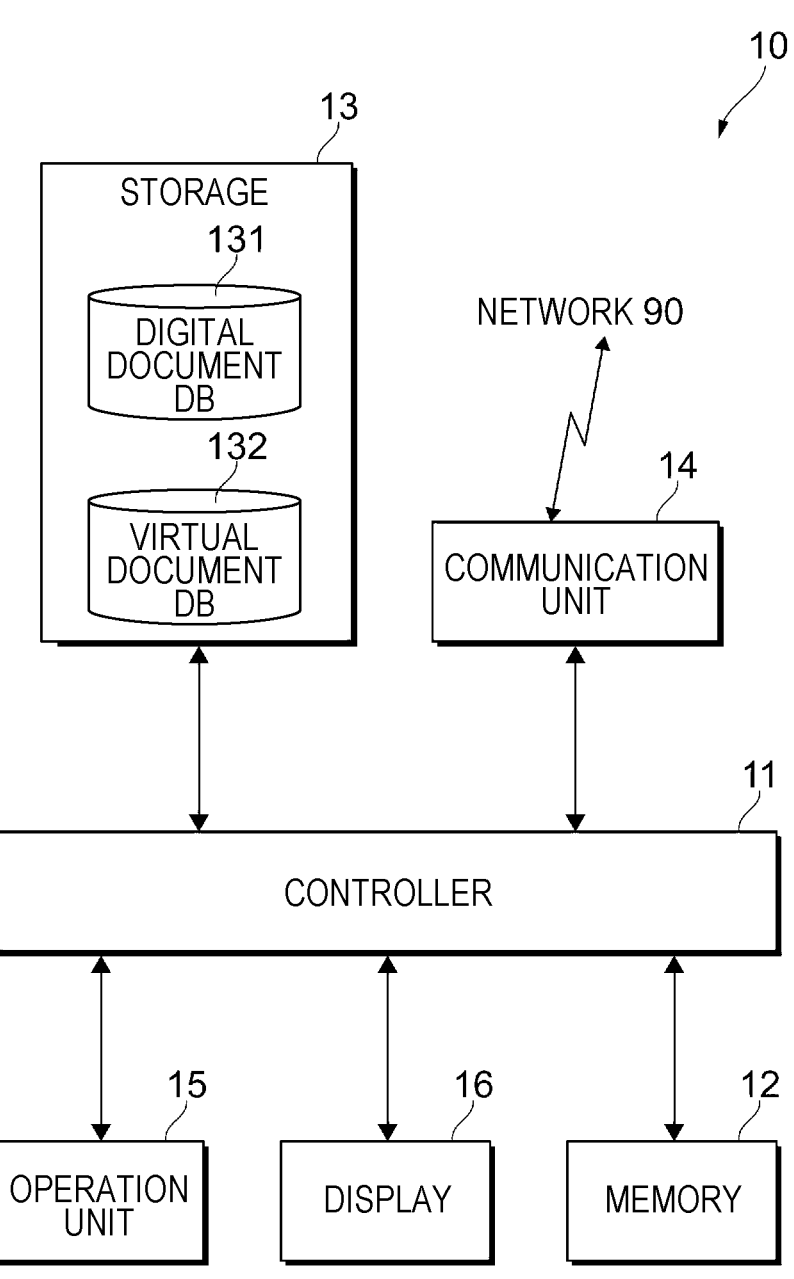
FIG. 2 is a block diagram illustrating the hardware configuration of a user terminal, which serves as an information processing apparatus according to the exemplary embodiment.

FIG. 2 is a block diagram illustrating the hardware configuration of the user terminal 10, which serves as an information processing apparatus according to the exemplary embodiment.

The user terminal 10 includes a controller 11, a memory 12, a storage 13, a communication unit 14, an operation unit 15, and a display 16. These elements are connected to each other via a data bus, an address bus, and a peripheral component interconnect (PCI) bus, for example.

The controller 11 is a processor that controls the functions of the user terminal 10 as a result of executing various software programs, such as an operating system (OS) (basic software) and application software. The controller 11 is constituted by a central processing unit (CPU), for example. The memory 12 is a storage region for storing various software programs and data used for the execution of the software programs, and is used as a work area by the controller 11 to execute processing. The memory 12 is constituted by a random access memory (RAM), for example.

The storage 13 is a storage region for storing data to be input into various software programs and data output therefrom. The storage 13 is constituted by a hard disk drive (HDD), a solid state drive (SSD), or a semiconductor memory, for example, used for storing programs and various types of setting data. In the storage 13, a digital document database (DB) 131 and a virtual document DB 132, for example, are stored as databases for storing various items of information. The digital document DB 131 stores one or more digital documents whose thumbnail images can be displayed in a workspace. The virtual document DB 132 stores generated virtual documents.

The communication unit 14 sends and receives data to and from the management server 30 and external devices via the network 90. The operation unit 15 is constituted by a keyboard, a mouse, a mechanical button, and a switch, for example, and receives an input operation. The operation unit 15 may be a touch sensor, which integrally forms a touch-screen with the display 16. The display 16 is constituted by a liquid crystal display or an organic electroluminescence (EL) display, for example, used for displaying information, and displays image data and text data, for example. On the display 16, a workspace and a search user interface, for example, are displayed.

Hardware Configuration of Management Server

The hardware configuration of the management server 30 is similar to that of the user terminal 10 shown in FIG. 2. That is, the management server 30 includes a controller, a memory, a storage, a communication unit, an operation unit, and a display having functions similar to the controller 11, the memory 12, the storage 13, the communication unit 14, the operation unit 15, and the display 16, respectively, shown in FIG. 2. An explanation and illustration of the hardware configuration of the management server 30 is omitted.

Functional Configuration of User Terminal

FIG. 3 is a block diagram illustrating the functional configuration of the controller 11 of the user terminal 10.

The controller 11 of the user terminal 10 implements functions such as a document manager 101, a display controller 102, an input operation receiver 103, a search result obtainer 104, a page extractor 105, a virtual document generator 106, a digital document generator 107, and a sending controller 108.

The document manager 101 stores a digital document in a database and manages the stored digital document. More specifically, the document manager 101 stores one or more digital documents whose thumbnail images can be displayed in a workspace in the digital document DB 131 of the storage 13 and manages the stored digital documents. Identification information (document ID, for example) for uniquely identifying each of one or more digital documents stored in the digital document DB 131 is associated with each of one or more digital documents.

The display controller 102 performs control to display various items of information on the display 16 (see FIG. 2). For instance, the display controller 102 performs control to display a workspace and a search user interface on the display 16. A workspace and a search user interface can be displayed on the display 16 as a result of starting user dedicated application software preinstalled in the user terminal 10 or accessing a user dedicated website.

The display controller 102 also performs control to display, in a workspace, a thumbnail image of a digital document selected by a user input operation. The display controller 102 also performs control to display, on a search user interface, a thumbnail image of a virtual document constituted by one or more representative pages obtained as search results. The display controller 102 also performs control to display, together with a virtual document, identification information for identifying each of one or more predetermined pages forming the virtual document on a search user interface so that the identification information can be selected.

The identification information is information from which a digital document can be uniquely identified (the name of the digital document, for example) or information from which a predetermined page forming this digital document can be uniquely identified (page number, for example).

The display controller 102 also performs control to display, on a search user interface, a preview image of one or more predetermined pages of a virtual document selected by a user input operation in an enlarged size so that the size of the preview image becomes larger than that of the thumbnail image of the virtual document. The order of pages to be displayed as a preview image of a virtual document in an enlarged size is not restricted to a particular order. For example, the pages of a preview image of a virtual document may be displayed in order of the name, format, creation date, and data amount of one or more digital documents obtained as search results. A user may be able to set the display order in advance.

The display controller 102 also performs control, in response to a user input operation (page switching operation, for example) on a preview image of one or more predetermined pages forming a virtual document, to sequentially display the individual pages of the preview image. More specifically, the display controller 102 performs control, in response to a user input operation, to display one previous or one following page of the current page displayed in an enlarged size on a search user interface. A specific example of a page displayed in an enlarged size on a search user interface will be explained below in detail with reference to FIG. 9.

The display controller 102 also performs control, in response to an input operation for selecting one of the items of identification information for individually identifying the predetermined pages forming a virtual document, to display a preview image of the predetermined page identified by the selected item of information in an enlarged size on the search user interface so that the display size of the preview image becomes larger than that of the thumbnail image of the virtual document.

The input operation receiver 103 receives a user input operation. Examples of the user input operation are a touch operation with a finger and a mouse operation. The input operation receiver 103 receives an input operation for displaying a workspace or a search user interface on the display 16 (see FIG. 2) by starting application software. The input operation receiver 103 also receives an input operation for specifying a digital document and displaying a thumbnail image of this digital document in a workspace.

The input operation receiver 103 also receives an input operation for searching through one or more digital documents displayed as thumbnail images in each of one or more workspaces. More specifically, the input operation receiver 103 receives an operation of inputting a search condition in a search box (see FIG. 9, for example) on a search user interface displayed on the display 16 to conduct a search.

The input operation receiver 103 also receives an input operation for selecting a thumbnail image of a virtual document displayed on a search user interface. Examples of the input operation for selecting a thumbnail image of a virtual document are an operation for placing a cursor, which moves on a search user interface in response to a user mouse operation, over a thumbnail image of a virtual document (mouseover operation) and an operation for touching or clicking a thumbnail image of a virtual document.

The input operation receiver 103 also receives an input operation for switching the page of a preview image of one or more predetermined pages of a virtual document displayed in an enlarged size on a search user interface. The input operation receiver 103 also receives an input operation for storing a virtual document. More specifically, the input operation receiver 103 receives an input operation for storing a virtual document in the virtual document DB 132 of the storage 13 as a "virtual document" by linking the thumbnail image of the virtual document and a search condition used for a search with the virtual document. The input operation receiver 103 also receives an input operation for storing a virtual document as a digital document. More specifically, the input operation receiver 103 receives an input operation for storing a search result in the digital document DB 131 of the storage 13 as a regular digital document.

The search result obtainer 104 obtains search results found by using a search condition input in the search box of the search user interface.

The page extractor 105 extracts a predetermined page of each of one or more digital documents obtained as search results. Examples of the predetermined page are a head page of a digital document and a page including text or graphics, for example, that matches a search condition. The predetermined page may be a page preset based on a search condition or a page preset in response to a user input operation.

The virtual document generator 106 generates a thumbnail image of a virtual document representing a set of one or more predetermined pages obtained as results of conducting a search by using a search condition specified by a user. If the head page of a digital document is set as the predetermined page, the virtual document generator 106 generates a thumbnail image of a virtual document constituted by the head page of each of one or more digital documents each including a page that matches the search condition. If a page including text or graphics, for example, that matches a search condition is set as the predetermined page, the virtual document generator 106 generates a thumbnail image of a virtual document constituted by one or more pages that match the search condition. A thumbnail image generated by the virtual document generator 106 may be stored in response to a user input operation. In this case, a generated thumbnail image is stored in the virtual document DB 132 of the storage 13 by linking a search condition used for a search with the thumbnail image.

The digital document generator 107 generates a digital document constituted by one or more predetermined pages extracted by the page extractor 105. A digital document generated by the digital document generator 107 may be linked with a search condition used for a search and information indicating the time point of the search. Information indicating the time point of the search may be linked with the generated digital document by forming this information into metadata or forming text data indicating the time point of the search in part of the digital document (in the head page or a margin of the digital document, for example). Unlike a virtual document generated by the virtual document generator 106, a digital document generated by the digital document generator 107 is a regular digital document whose thumbnail image can be displayed in a workspace. A digital document generated by the digital document generator 107 is thus stored in the digital document DB 131 of the storage 13 and is managed.

The sending controller 108 performs control to send various items of information to the management server 30 or an external source via the communication unit 14 (see FIG. 2). For example, if the management server 30 executes processing for generating a thumbnail image of a virtual document, for example, the sending controller 108 performs control to send various items of input information received by the input operation receiver 103 to the management server 30.

Functional Configuration of Management Server

Figure 4:
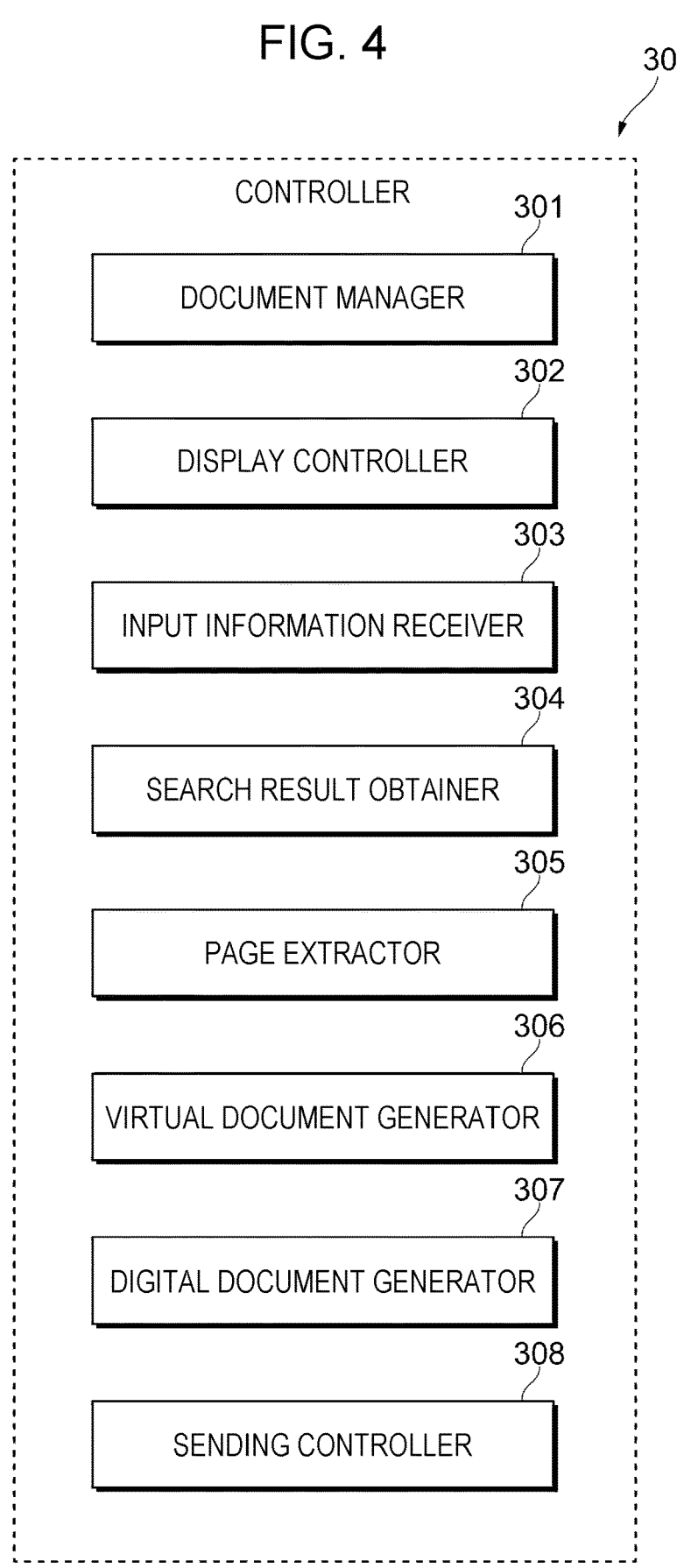
FIG. 4 is a block diagram illustrating the functional configuration of a controller of a management server in a case in which the management server executes processing for generating a thumbnail image of a virtual document, for example.

FIG. 4 is a block diagram illustrating the functional configuration of the controller of the management server 30 in a case in which the management server 30 executes some processing operations instead of the user terminal 10, such as processing for generating a thumbnail image of a virtual document.

If the management server 30 executes some processing operations performed by the user terminal 10, it implements functions such as a document manager 301, a display controller 302, an input information receiver 303, a search result obtainer 304, a page extractor 305, a virtual document generator 306, a digital document generator 307, and a sending controller 308. The document manager 301, the display controller 302, the search result obtainer 304, the page extractor 305, the virtual document generator 306, and the digital document generator 307 are similar to the document manager 101, the display controller 102, the search result obtainer 104, the page extractor 105, the virtual document generator 106, and the digital document generator 107, respectively, shown in FIG. 3 and an explanation thereof is thus omitted.

The input information receiver 303 obtains various items of input information sent from the user terminal 10. For example, the input information receiver 303 obtains input information for displaying a digital document stored and managed as a database in the storage of the management server 30 in a workspace or a search user interface.

The input information receiver 303 also obtains input information for searching through one or more digital documents displayed as thumbnail images in each of one or more workspaces. The input information receiver 303 also obtains input information for selecting a thumbnail image of a virtual document displayed on a search user interface.

The input information receiver 303 also obtains input information for switching the page of a preview image of one or more predetermined pages of a virtual document displayed in an enlarged size on a search user interface. The input information receiver 303 also obtains input information for storing a search condition and input information for storing a search result as a digital document.

The sending controller 308 performs control to send various items of information to the user terminal 10 or external devices via the communication unit. For example, the sending controller 308 performs control to send the user terminal 10 information on a digital document specified by a user input operation among one or more digital documents stored as a database in the storage of the management server 30. Examples of information on a digital document are data on a thumbnail image of an extracted digital document, data on a preview image of a predetermined page of an extracted digital document, and identification information for identifying each of one or more predetermined pages forming a virtual document.

Processing Procedures Executed by User Terminal

Figure 5:
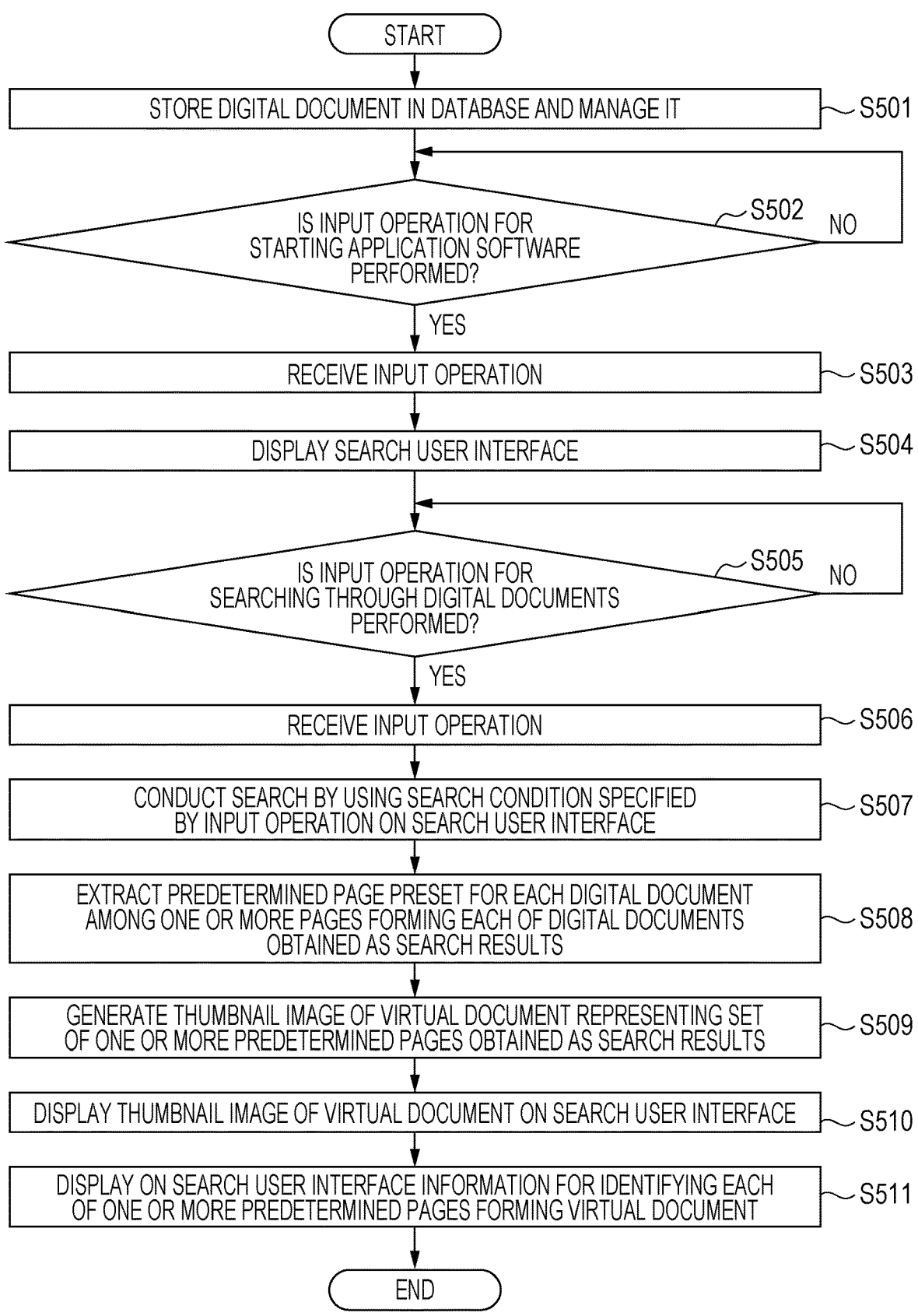
FIGS. 5, 6A, and 6B are flowcharts illustrating processing procedures executed by the user terminal.
Figure 6A:
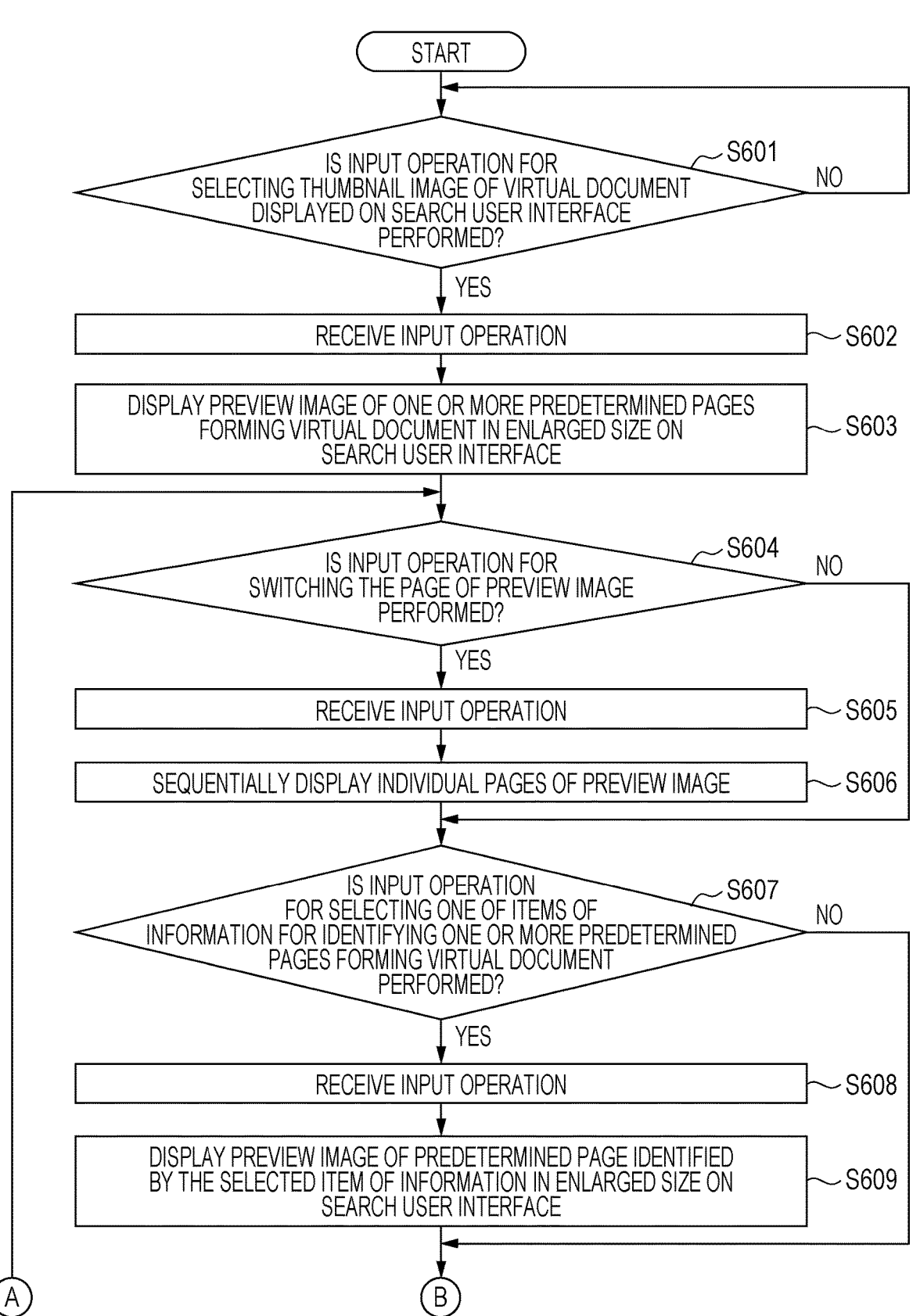
Figure 6B:
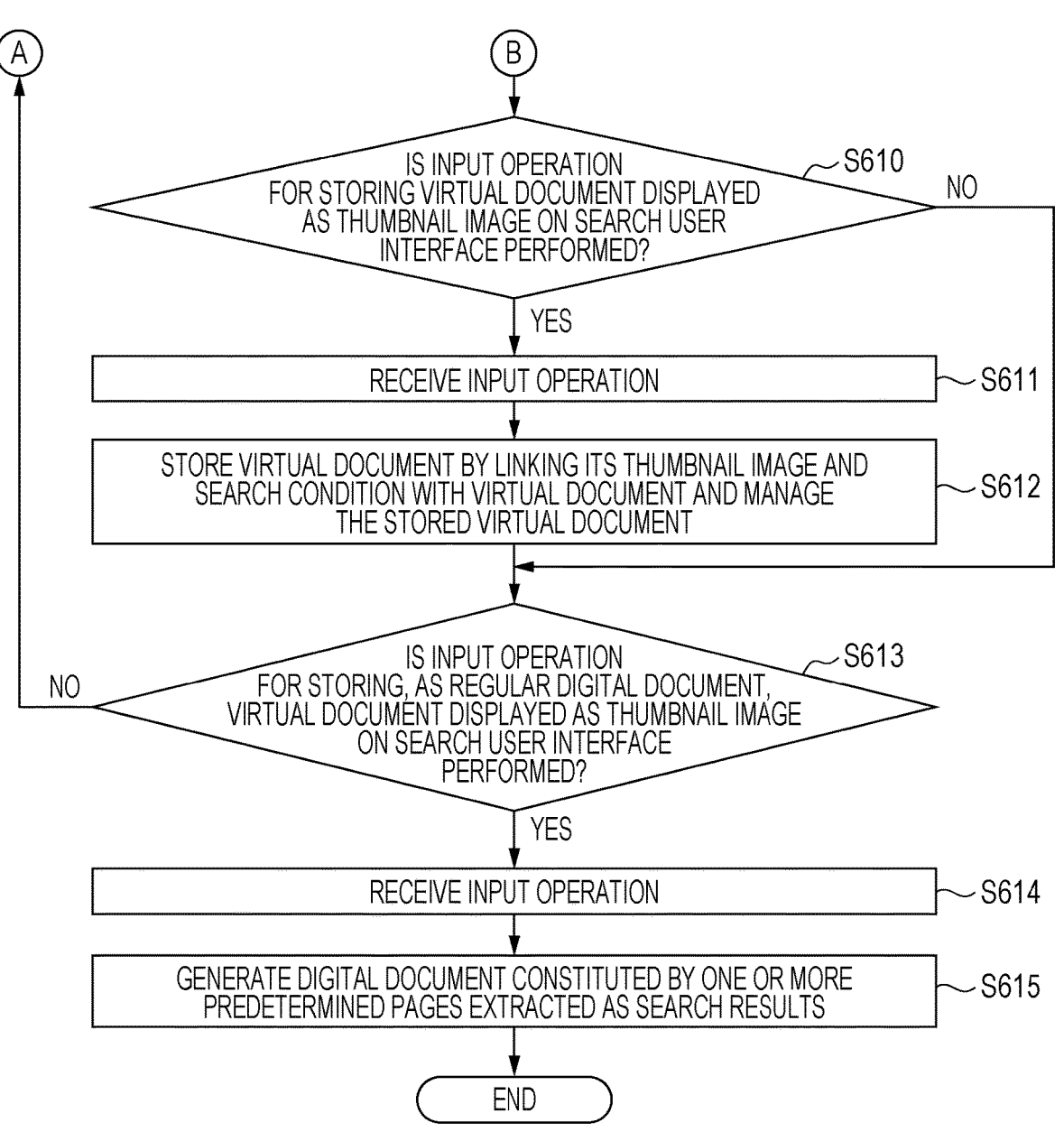

FIGS. 5, 6A, and 6B are flowcharts illustrating processing procedures executed by the user terminal 10.

FIG. 5 is a flowchart illustrating a procedure executed by the user terminal 10 from when the user terminal 10 stores a digital document in a database and manages the stored digital document until when the user terminal 10 displays on a search user interface identification information for identifying each of one or more predetermined pages forming a virtual document so that the identification information can be selected.

In step S501, the user terminal 10 stores a digital document in a database and manages the stored digital document. More specifically, the user terminal 10 stores one or more digital documents, whose thumbnail images can be displayed in workspaces, in the digital document DB 131 (see FIG. 2) of the storage 13 and manages the stored digital documents.

If an input operation for starting application software is performed (YES in step S502), the user terminal 10 receives the input operation in step S503 and displays a search user interface on the display 16 (see FIG. 2) in step S504. If an input operation for starting application software is not performed (NO in step S502), the user terminal 10 repeats step S502 until such an input operation is performed.

If an input operation for searching through one or more digital documents displayed as thumbnail images in each of one or more workspaces is performed (YES in step S505), the user terminal 10 receives the input operation in step S506. Then, in step S507, the user terminal 10 conducts a search by using a search condition specified by an input operation on the search user interface. In step S508, the user terminal 10 extracts a page preset for each of one or more digital documents among one or more pages forming each of one or more digital documents obtained as search results. If an input operation for searching through one or more digital documents displayed as thumbnail images in each of one or more workspaces is not performed (NO in step S505), the user terminal 10 repeats step S505 until such an input operation is performed.

In step S509, the user terminal 10 generates a thumbnail image of a virtual document representing a set of one or more predetermined pages obtained as search results in step S507. In step S510, the user terminal 10 displays the generated thumbnail image on the search user interface. In step S511, on the search user interface, the user terminal 10 displays, together with the thumbnail image of the virtual document, identification information for identifying each of one or more predetermined pages forming the virtual document so that the identification information can be selected.

FIGS. 6A and 6B are a flowchart illustrating a procedure executed by the user terminal 10 from when the user terminal 10 receives an input operation for selecting the thumbnail image of a virtual document displayed on the search user interface until when the user terminal 10 generates a digital document constituted by one or more predetermined pages extracted as search results.

If an input operation for selecting the thumbnail image of a virtual document displayed on the search user interface is performed (YES in step S601), the user terminal 10 receives the input operation in step S602. In step S603, the user terminal 10 displays a preview image of one or more predetermined pages forming the virtual document in an enlarged size on the search user interface so that the size of the preview image becomes larger than that of the thumbnail image of the virtual document. If an input operation for selecting the thumbnail image of a virtual document displayed on the search user interface is not performed (NO in step S601), the user terminal 10 repeats step S601 until such an input operation is performed.

If an input operation for switching the page of the preview image of one or more predetermined pages forming the virtual document is performed (YES in step S604), the user terminal 10 receives the input operation in step S605. In step S606, the user terminal 10 sequentially displays the individual pages of the preview image. If an input operation for switching the page of the preview image is not performed (NO in step S604), the user terminal 10 proceeds to step S607.

If an input operation for selecting one of the items of identification information for individually identifying one or more predetermined pages forming the virtual document is performed (YES in step S607), the user terminal 10 receives the input operation in step S608. Then, in step S609, the user terminal 10 displays a preview image of the predetermined page identified by the selected item of information in an enlarged size on the search user interface so that the size of the preview image becomes larger than that of the thumbnail image of the virtual document. If an input operation for selecting one of the items of identification information for individually identifying one or more predetermined pages forming the virtual document is not performed (NO in step S607), the user terminal 10 proceeds to step S610.

If an input operation for storing the virtual document displayed as a thumbnail image on the search user interface is performed (YES in step S610), the user terminal 10 receives the input operation in step S611. Then, in step S612, the user terminal 10 stores the virtual document in a database by linking the thumbnail image of the virtual document and the search condition used for a search with the virtual document, and manages the stored virtual document. If an input operation for storing the virtual document on the search user interface is not performed (NO in step S610), the user terminal 10 proceeds to step S613.

If an input operation for storing, as a regular digital document, the virtual document displayed as a thumbnail image on the search user interface is performed (YES in step S613), the user terminal 10 receives the input operation in step S614. Then, in step S615, the user terminal 10 generates a digital document constituted by one or more predetermined pages extracted as search results. If an input operation for storing, as a regular digital document, the virtual document displayed on the search user interface is not performed (NO in step S613), the user terminal 10 returns to step S604.

Processing Procedures Executed by Management Server

Figure 7:
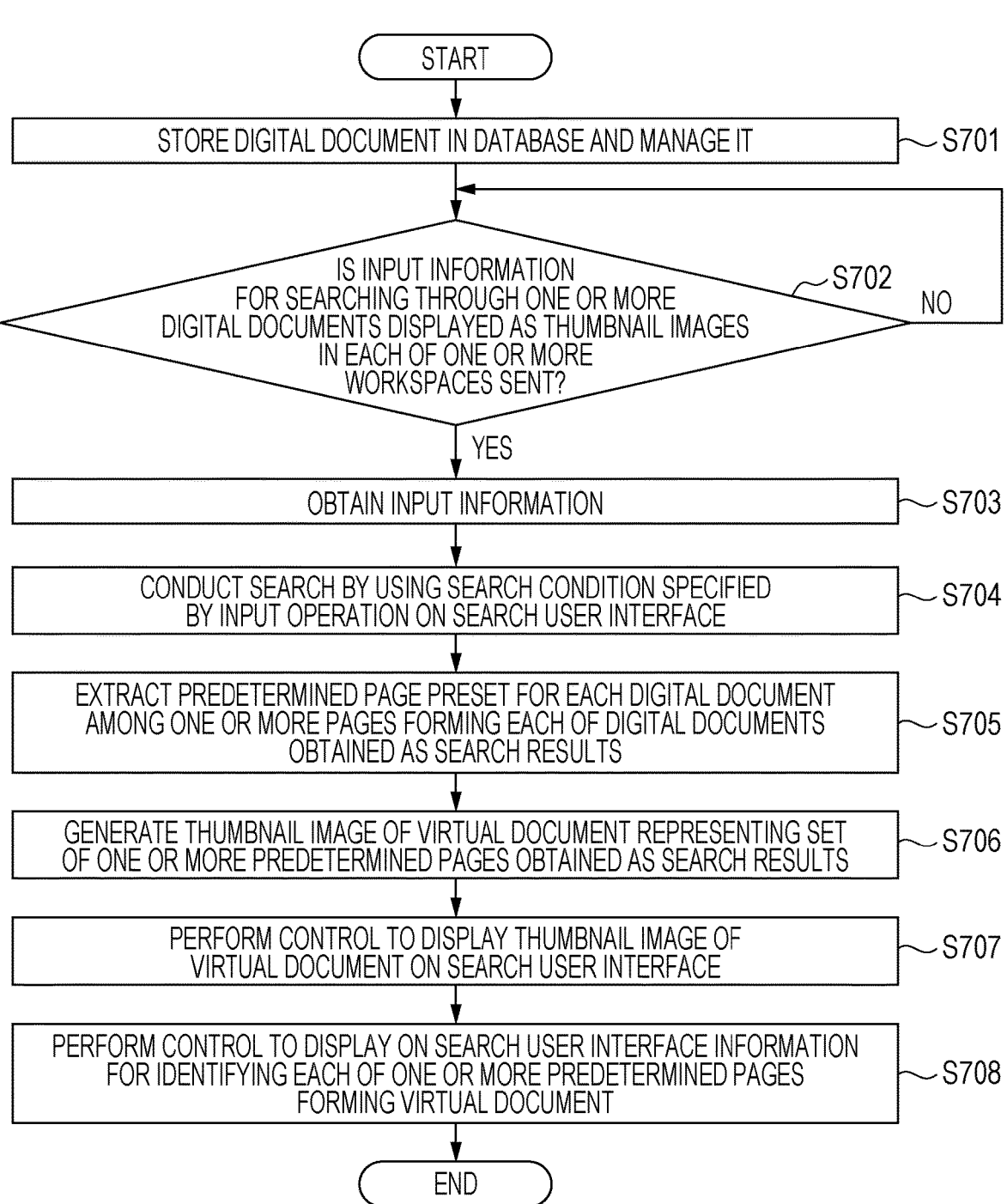
FIGS. 7, 8A, and 8B are flowcharts illustrating processing procedures executed by the management server in a case in which the management server executes processing for generating a thumbnail image of a virtual document, for example.
Figure 8A:
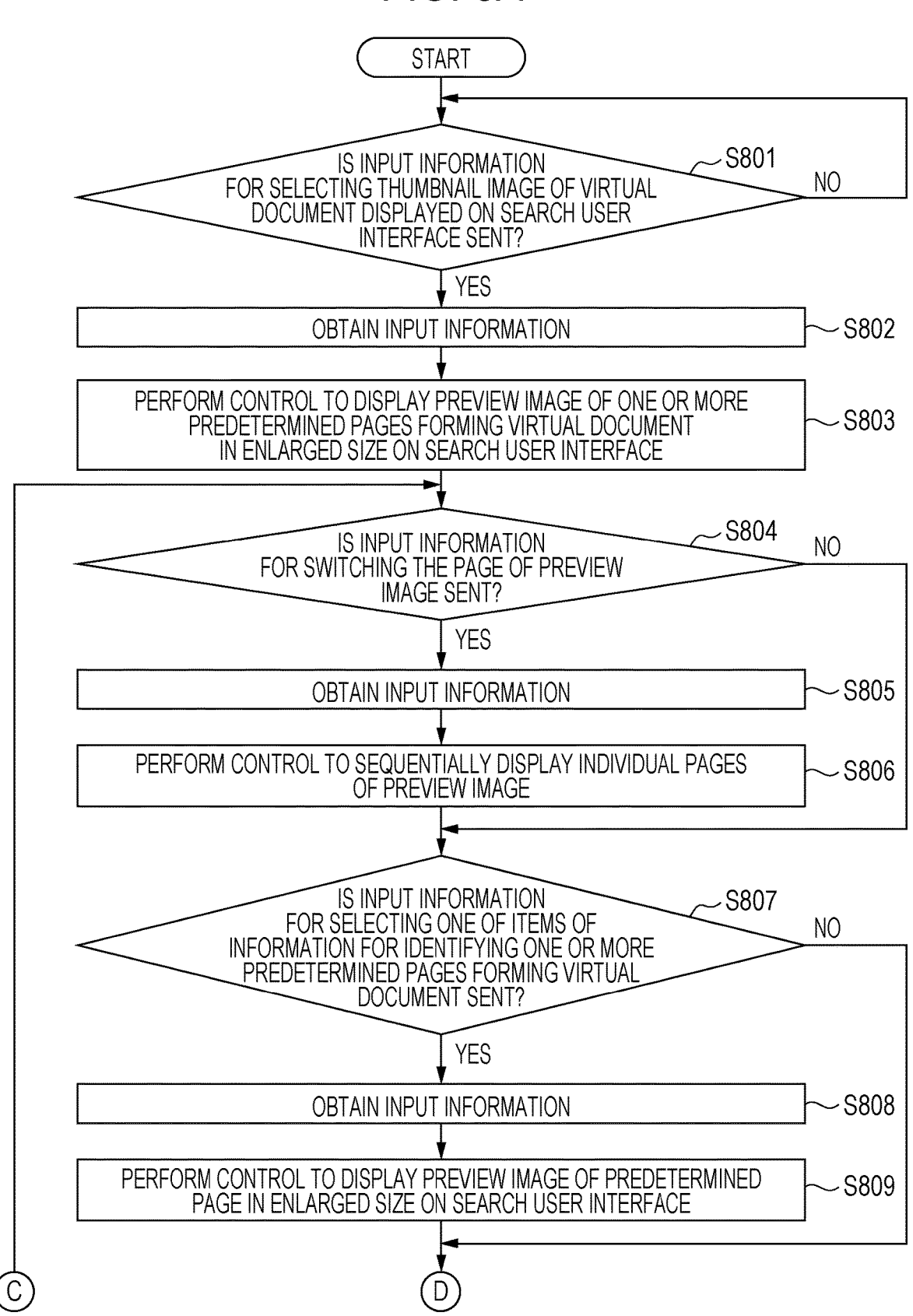
Figure 8B:
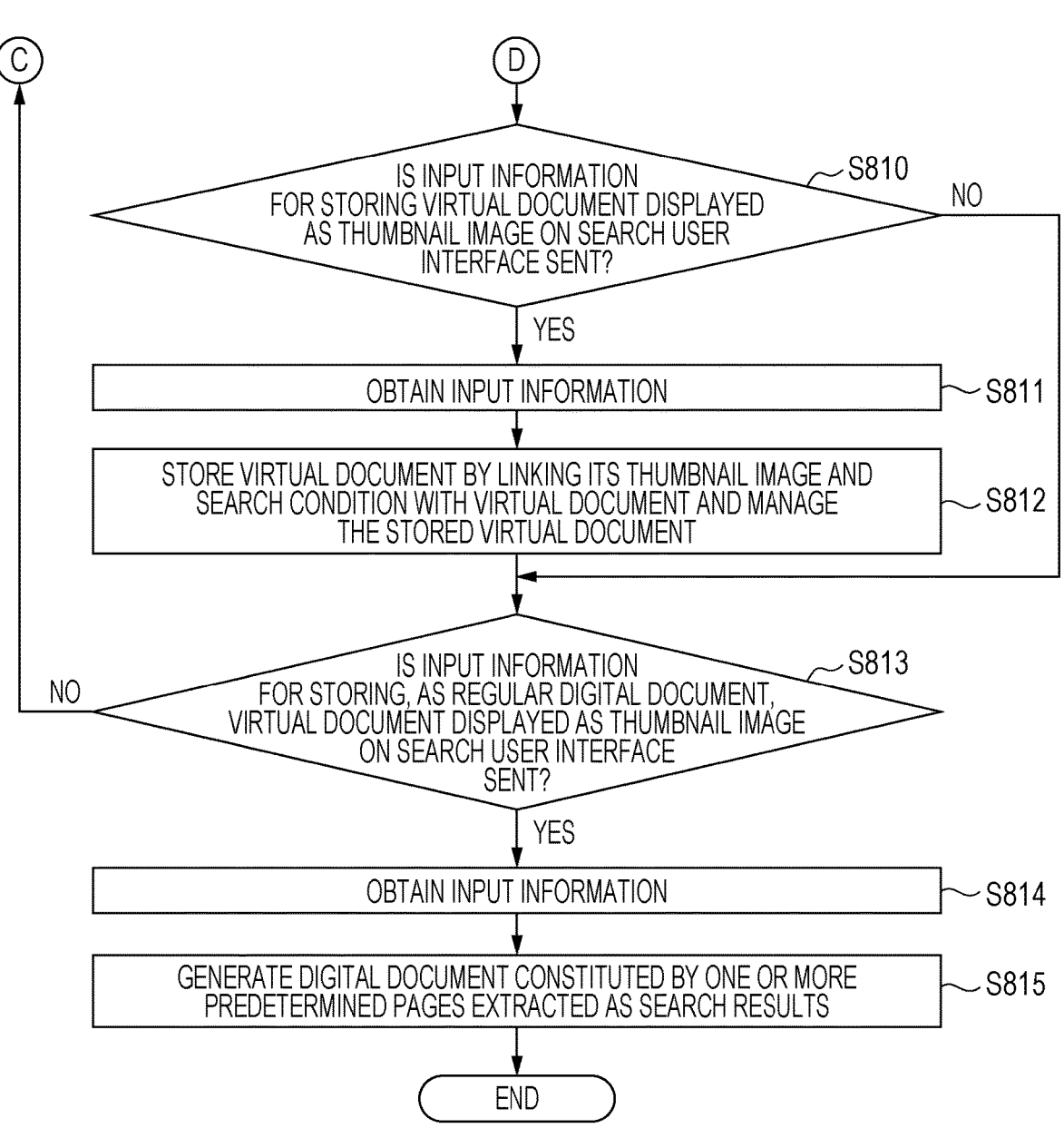

FIGS. 7, 8A, and 8B are flowcharts illustrating processing procedures executed by the management server 30 in a case in which the management server 30 executes some processing operations instead of the user terminal 10, such as processing for generating a thumbnail image of a virtual document.

FIG. 7 is a flowchart illustrating a procedure executed by the management server 30 from when the management server 30 stores a digital document in a database and manages the stored digital document until when the management server 30 performs control to display, on a search user interface, identification information for identifying each of one or more predetermined pages forming a virtual document so that the identification information can be selected.

In step S701, the management server 30 stores a digital document in a database and manages it. If input information input into the user terminal 10 by a user input operation to search through one or more digital documents displayed as thumbnail images in each of one or more workspaces is sent from the user terminal 10 (YES in step S702), the management server 30 obtains the input information in step S703. Then, in step S704, the management server 30 conducts a search by using a search condition specified by the input operation performed on the search user interface. In step S705, the management server 30 extracts a page preset for each of one or more digital documents among one or more pages forming each of one or more digital documents obtained as search results. If input information for searching through one or more digital documents displayed as thumbnail images in each of one or more workspaces is not sent from the user terminal 10 (NO in step S702), the management server 30 repeats step S702 until such input information is sent.

In step S706, the management server 30 generates a thumbnail image of a virtual document representing a set of one or more predetermined pages obtained as search results in step S704. In step S707, the management server 30 performs control to display the generated thumbnail image on the search user interface. In step S708, the management server 30 performs control to display, together with the thumbnail image of the virtual document, identification information for identifying each of one or more predetermined pages forming the virtual document on the search user interface so that the identification information can be selected.

FIGS. 8A and 8B are a flowchart illustrating a procedure executed by the management server 30 from when the management server 30 obtains input information for selecting the thumbnail image of a virtual document displayed on the search user interface until when the management server 30 generates a digital document constituted by one or more predetermined pages extracted as search results.

If input information input into the user terminal 10 by a user input operation to select the thumbnail image of a virtual document displayed on the search user interface is sent from the user terminal 10 (YES in step S801), the management server 30 obtains the input information in step S802. In step S803, the management server 30 performs control to display a preview image of one or more predetermined pages forming the virtual document specified by the input information in an enlarged size on the search user interface so that the size of the preview image becomes larger than that of the thumbnail image of the virtual document. If input information for selecting the thumbnail image of a virtual document displayed on the search user interface is not sent from the user terminal 10 (NO in step S801), the management server 30 repeats step S801 until such input information is sent.

If input information input into the user terminal 10 by a user input operation to switch the page of the preview image of one or more predetermined pages forming the virtual document is sent from the user terminal 10 (YES in step S804), the management server 30 obtains the input information in step S805. In step S806, the management server 30 performs control to sequentially display the individual pages of the preview image, based on the obtained input information. If input information for switching the page of the preview image is not sent from the user terminal 10 (NO in step S804), the management server 30 proceeds to step S807.

If input information input into the user terminal 10 by a user input operation to select one of the items of identification information for individually identifying one or more predetermined pages forming the virtual document is sent from the user terminal 10 (YES in step S807), the management server 30 obtains the input information in step S808. Then, in step S809, the management server 30 performs control to display a preview image of the predetermined page identified by the obtained input information in an enlarged size on the search user interface so that the size of the preview image becomes larger than that of the thumbnail image of the virtual document. If input information for selecting one of the items of identification information for individually identifying one or more predetermined pages forming the virtual document is not sent from the user terminal 10 (NO in step S807), the management server 30 proceeds to step S810.

If input information input into the user terminal 10 by a user input operation to store the virtual document displayed as a thumbnail image on the search user interface is sent from the user terminal 10 (YES in step S810), the management server 30 obtains the input information in step S811. Then, in step S812, the management server 30 stores the virtual document specified by the input information in a database by linking the thumbnail image of the virtual document and the search condition used for a search with the virtual document, and manages the stored virtual document. If input information for storing the virtual document displayed on the search user interface is not sent from the user terminal 10 (NO in step S810), the management server 30 proceeds to step S813.

If input information for storing, as a regular digital document, the virtual document displayed as a thumbnail image on the search user interface is sent from the user terminal 10 (YES in step S813), the management server 30 obtains the input information in step S814. Then, in step S815, the management server 30 generates a digital document constituted by one or more predetermined pages extracted as search results. If input information for storing, as a regular digital document, the virtual document displayed on the search user interface is not sent from the user terminal 10 (NO in step S813), the management server 30 returns to step S804.

SPECIFIC EXAMPLES

Figure 9:
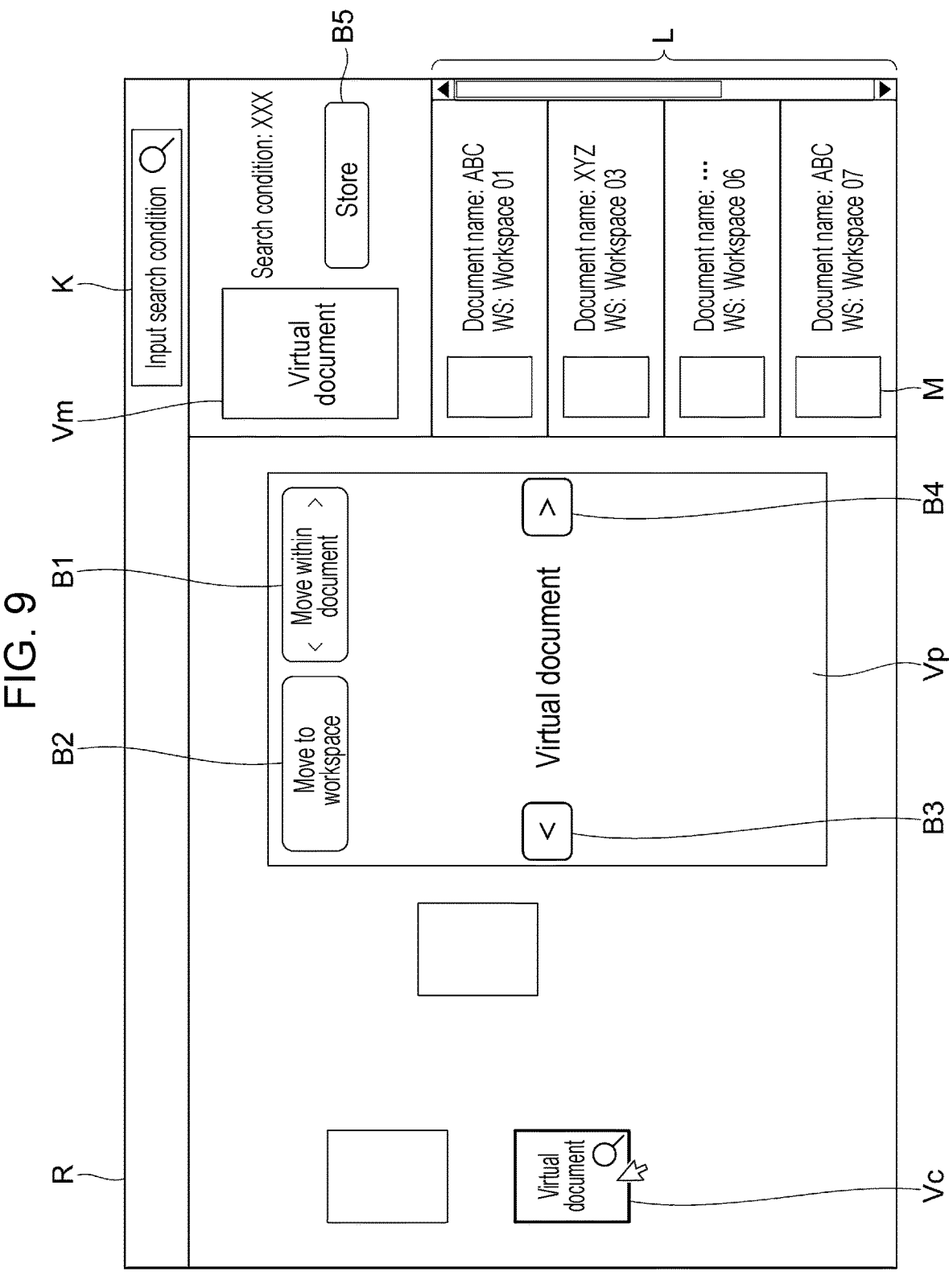
FIGS. 9 through 11 illustrate specific examples of a user interface used for conducting a search and displayed on a display of the user terminal.
Figure 10:
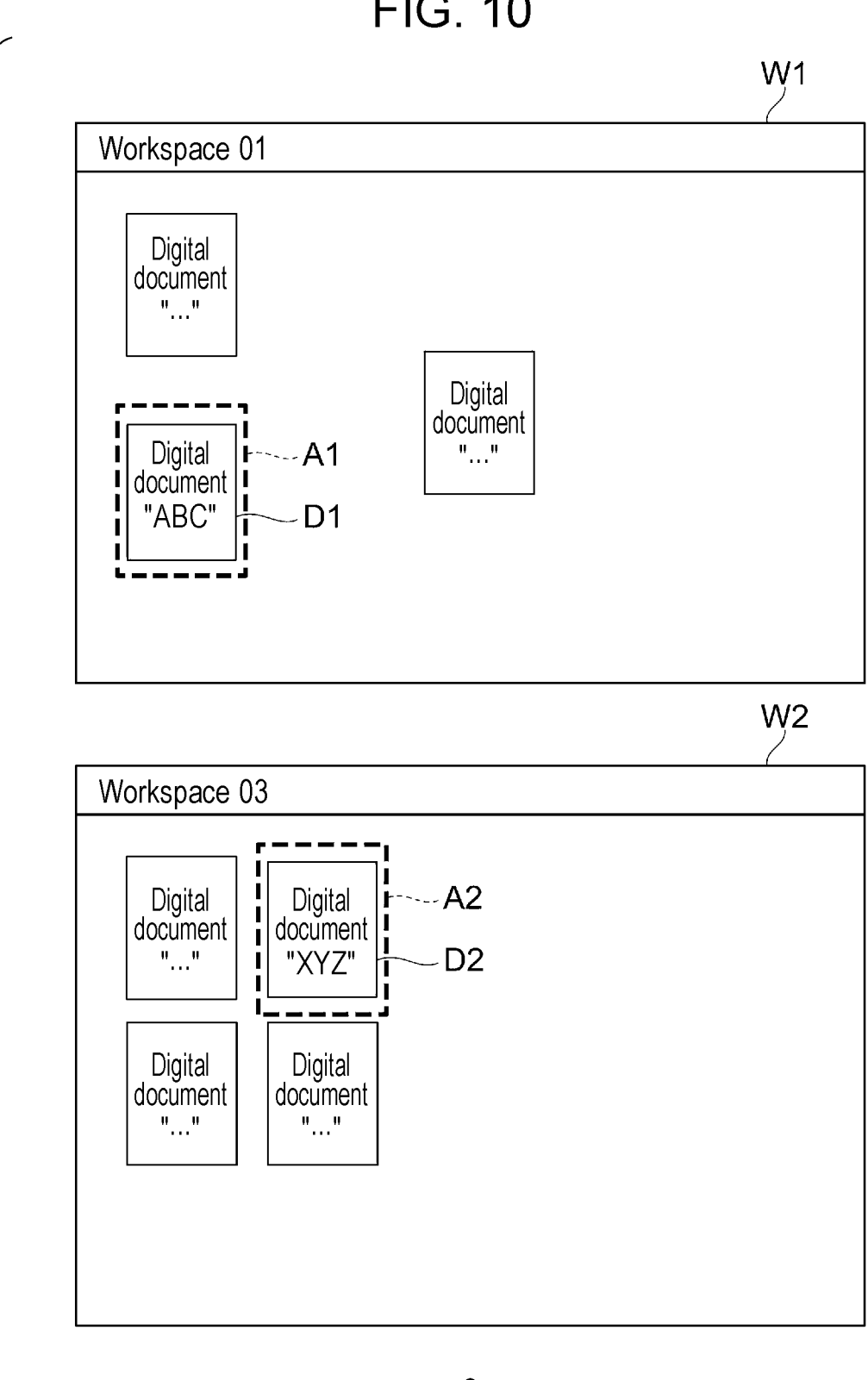
Figure 11:
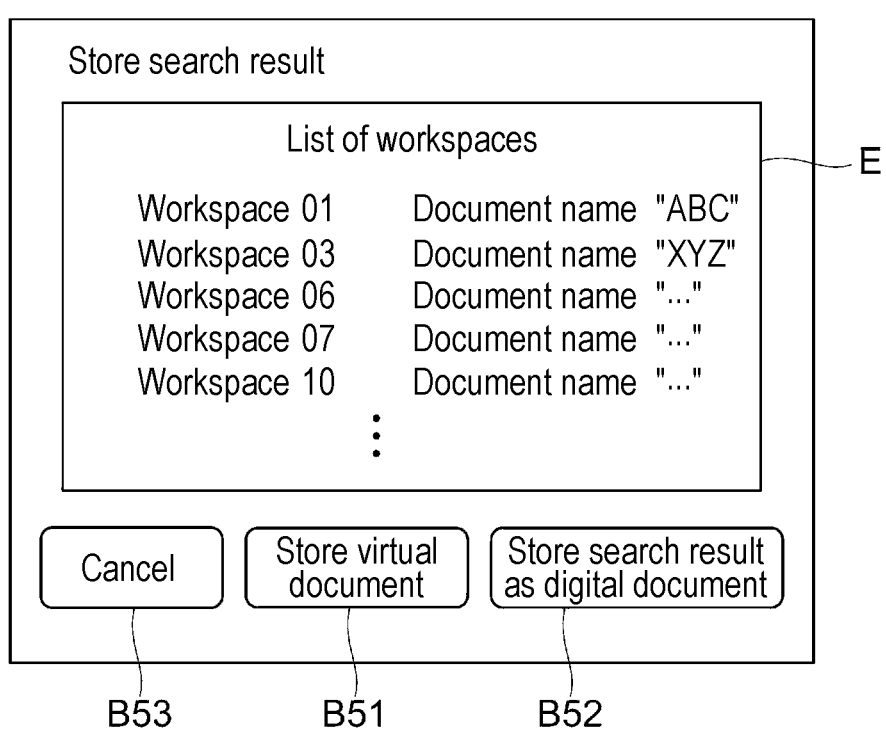

FIGS. 9 through 11 illustrate specific examples of a search user interface displayed on the display 16 of the user terminal 10.

As discussed above, to conduct a search through one or more digital documents displayed as thumbnail images in each of one or more workspaces, a user performs an input operation on the user terminal 10 for starting application software. Then, a search user interface is displayed on the display 16. As an example of the search user interface, a search user interface R is shown in FIG. 9.

On the top right of the search user interface R, a search box K for searching through one or more digital documents displayed as thumbnail images in each of one or more workspaces is displayed. When a user inputs a search condition into the search box K and a search is conducted, a thumbnail image Vm of a virtual document representing a set of one or more predetermined pages obtained as search results is displayed in a display region under the search box K.

In a display region under the thumbnail image Vm of the virtual document, a list of search results is displayed. If the head page of a digital document is set as the predetermined page, a thumbnail image M of the head page of each of one or more digital documents having a page that matches the search condition and information for identifying a digital document having a page that matches the search condition are displayed in a list.

If a page including text or graphics, for example, that matches the search condition is set as the predetermined page, a thumbnail image M of each of one or more pages that match the search condition and information for identifying a digital document including such a page are displayed in a list. If one document includes plural pages that match the search condition, plural pages included in a virtual document may belong to one digital document. In this case, the page having the smallest page number of the plural pages may be selected and used to form a virtual document. The user may be able to preset which one of the plural pages that match the search condition is to be used to form a virtual document by performing an input operation.

Hereinafter, a list of thumbnail images M and information for identifying each digital document having a page that matches a search condition will be called a search result list L.

If the user performs a mouseover operation as an example of the input operation for selecting the thumbnail image Vm of the virtual document, a preview image Vp of one or more predetermined pages forming the virtual document is displayed in an enlarged size at the center of the search user interface R so that the size of the preview image Vp becomes larger than that of the thumbnail image Vm of the virtual document. At this time, among the items of information displayed in the search result list L, the item of information corresponding to the preview image Vp is highlighted.

The displayed preview image Vp includes text and/or an image indicated on a predetermined page of a digital document and also includes a user interface, which is not part of the digital document. For example, a button B1 named "Move within document" and a button B2 named "Move to workspace" disposed on the upper part of the preview image Vp and buttons B3 and B4 disposed on the left and right sides of the preview image Vp are displayed as user interfaces, which are not part of the digital document.

The button B1 is used for switching the page displayed as the preview image Vp to another page of the same digital document. The button B2 is used for displaying on the display 16 the workspace including the thumbnail image of the digital document displayed as the preview image Vp. The buttons B3 and B4 are each used for switching from the digital document displayed as the preview image Vp to another digital document included in the search results.

Instead of pressing the button B3 or the button B4, the digital document displayed as the preview image Vp may be switched to another digital document included in the search results by selecting one of the items of information of the digital documents displayed in the search result list L. For example, as a result of performing, for example, a mouseover operation, on one of the items of information in the search result list L, the preview image Vp of the predetermined page of the digital document corresponding to the selected item of information is displayed in an enlarged size. If, a certain operation, such as a double-click operation, is performed subsequent to the mouseover operation, the workspace including the thumbnail image of the digital document displayed as the preview image Vp may be displayed on the display 16.

As a result of pressing the button B2 in FIG. 9 or performing a certain operation, such as a double-click operation, on one item of information on the digital document displayed in the search result list L, the workspace including the thumbnail image of the digital document corresponding to the selected item of information is displayed on the display 16. It is now assumed, for example, that the button B2 of the preview image Vp is pressed or one item of information in the search result list L is double-clicked for a digital document called "ABC" (document name) among the digital documents in the search result list L. In this case, as shown in FIG. 10, a workspace W1 named "Workspace 01" showing a thumbnail image of the digital document "ABC" is displayed on the display 16.

In part of the workspace W1 shown in FIG. 10, a thumbnail image D1 of the digital document "ABC" is displayed. A frame A1 indicated by the broken lines is displayed to surround the thumbnail image D1. The frame A1 defines a document selected by a user from the search result list L. Likewise, if, for a digital document named "XYZ" (document name) among the digital documents displayed in the search result list in FIG. 9, the button B2 in the preview image Vp is pressed or the item of information corresponding to the digital document "XYZ" in the search result list L is double-clicked, a workspace W2 named "Workspace 03" is displayed on the display 16, as shown in FIG. 10. In part of the workspace W2, a thumbnail image D2 of the digital document "XYZ" is displayed. A frame A2 indicated by the broken lines is displayed to surround the thumbnail image D2. Other digital documents displayed in the search result list L in FIG. 9 can be displayed on the display 16 in a similar manner though they are not shown.

Referring back to FIG. 9, on the right side of the thumbnail image Vm of the virtual document displayed on the search user interface, information indicating the content of the search condition and a button B5 named "Store" are displayed. When the button B5 is pressed, a user interface for storing the displayed virtual document is displayed. An example of such a user interface is shown in FIG. 11.

On the user interface shown in FIG. 11, with an indication "Store search result", an information display field E named "list of workspaces", a button B51 named "Store virtual document", and a button B52 named "Store search result as digital document" are displayed. In the information display field E, items of information for identifying digital documents that match the search condition are displayed. In the example in FIG. 11, as information for identifying the digital documents, the names of the workspaces ("Workspace 01" and "Workspace 03", for example) in which thumbnail images are displayed and the names of the digital documents are displayed.

The button B51 is used for storing a search condition. When the button B51 is pressed, the thumbnail image Vm of a virtual document and the search condition used for a search are stored such that they are linked with each other. As shown in FIG. 9, the virtual document is stored as a search dedicated icon Vc named "Virtual document", for example. Upon receiving a certain operation (mouseover operation, for example) for selecting the search dedicated icon Vc displayed on the search user interface, a search result at a timing at which this operation is received is displayed as a thumbnail image Vm of a new virtual document or as a preview image Vp.

The button B52 is used for storing a search result. When the button B52 is pressed, the virtual document is stored as a regular digital document.

A user selects one or more digital documents from the items of information for specifying the digital documents displayed in the information display field E and then presses the button B52. Then, a virtual document constituted by one or more selected digital documents can be stored as a regular digital document. With this operation, a digital document that is likely to be noise included in the initially generated virtual document as a search result can be removed by the user input operation. If the user neither stores a search condition nor does it store a search result as a regular digital document, it presses a "Cancel" button B53.

While the exemplary embodiment has been described above, the disclosure is not limited to this exemplary embodiment. For example, the configuration of the information processing system 1 shown in FIG. 1 and that of the user terminal 10 shown in FIG. 2 are only examples, and the configurations of the information processing system 1 and the user terminal 10 are not restricted to particular configurations. The functional configuration of the user terminal 10 shown in FIG. 3 and that of the management server 30 shown in FIG. 4 are also only examples, and functional configurations of the user terminal 10 and the management server 30 are not restricted to particular configurations. The information processing system 1 may be configured in any manner if it has functions that implement the above-described processing operations as a whole. The functional configuration of the user terminal 10 and that of the management server 30 that implement these functions are not restricted to the configurations shown in FIGS. 3 and 4.

The order of steps executed by the user terminal 10 shown in FIGS. 5, 6A, and 6B and that of the management server 30 shown in FIGS. 7, 8A, and 8B are only examples, and the order of operations of the user terminal 10 and that of the management server 30 are not restricted to particular orders. The operations may not necessarily be executed in chronological order as shown in FIGS. 5 through 8B and may be executed in parallel or individually.

The specific examples shown in FIGS. 9 through 11 are only examples. For instance, in the example in FIG. 9, when a search condition is input into the search box K and a search is conducted, the thumbnail image Vm of a virtual document is displayed in a display region under the search box K. However, the thumbnail image Vm of a virtual document may not necessarily be displayed. For example, when a search is conducted, the preview image Vp may be directly displayed in an enlarged size.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing system comprising:
a processor configured to:
    extract, among one or more pages forming each of a plurality of digital documents, a predetermined page which is preset for each of the plurality of digital documents;
    perform control to generate a virtual document comprising a set of the extracted predetermined pages of the respective digital documents;
    perform control to generate a first image representing the virtual document, which comprises the set of the extracted predetermined pages of the respective digital documents, and to display the first image on a display; and
    perform control, in response to a first input operation performed on the first image by a user, to display a second image, which represents the extracted predetermined pages, in an enlarged size on the display so that a display size of the second image becomes larger than a display size of the first image;
wherein the plurality of digital documents are obtained as results of conducting a search by using a specified search condition, and wherein the processor is further configured to:
    when the control to display the second image is performed, display, in addition to the second image, a button to move from the second image to a workspace where the digital document including the extracted predetermined page represented by the second image is stored, and
    in a case where the button is selected by the user, perform control to change a display from the second image to the workspace where the digital document including the extracted predetermined page represented by the second image is stored.

2. The information processing system according to claim 1, wherein the processor is configured to:
    receive, as the first input operation, an operation for selecting the first image; and
    perform control to display, as the second image, a preview image in an enlarged size on the display so that the display size of the preview image becomes larger than the display size of the first image.

3. The information processing system according to claim 2, wherein the processor is configured to receive, as the operation for selecting the first image, an operation for placing a cursor over the first image, the cursor moving on the display in response to the first input operation.

4. The information processing system according to claim 2, wherein the processor is configured to:

extract a head page of each of the plurality of digital documents as the predetermined page; and perform control to display, upon receiving the operation for selecting the first image, a preview image which represents the head page of each of the plurality of digital documents in an enlarged size on the display so that the display size of the preview image becomes larger than the display size of the first image.

5. The information processing system according to claim 1, wherein the processor is configured to perform control to display the second image page by page in response to a second input operation performed on the second image by the user.

6. The information processing system according to claim 5, wherein the processor is configured to perform control, as the control to display the second image page by page, to display, in response to the second input operation, one previous page or one following page of a page represented by the second image displayed in the enlarged size on the display.

7. The information processing system according to claim 1, wherein the processor is configured to:

link the search condition and the first image with each other; and extract, in response to the first input operation performed on the first image, the predetermined page of each of the plurality of digital documents, the plurality of digital documents being obtained as results of conducting a search at a time point at which the first input operation is performed.

8. The information processing system according to claim 7, wherein the processor is configured to perform control to display, on the display, content of the first input operation performed on the first image linked with the search condition, the display being shared by the user and another user via a communication network.

9. The information processing system according to claim 1, wherein the processor is configured to generate a digital document constituted by the extracted predetermined pages.

10. The information processing system according to claim 9, wherein the processor is configured to link the generated digital document with the search condition used for the search and information indicating a time point at which the search is conducted.

11. The information processing system according to claim 1, wherein the processor is configured to perform control to display on the display, together with the first image, identification information for identifying each of the predetermined pages so that the identification information is selectable.

12. The information processing system according to claim 11, wherein the processor is configured to perform control, in response to a third input operation performed on the identification information by the user, to display the second image of a corresponding one of the predetermined pages identified by the identification information in an enlarged size on the display so that the display size of the second image becomes larger than the display size of the first image.

13. The information processing system according to claim 1, wherein the processor is configured to determine, among one or more pages forming each of the plurality of digital documents, a page to be extracted as the predetermined page in accordance with a type of the search condition.

14. The information processing system according to claim 13, wherein the processor is configured to determine the page to be extracted as the predetermined page in accordance with whether the type of the search condition is a name of the digital documents, a creation date of the digital documents, a creator of the digital documents, or a character string included in the digital documents.

15. The information processing system according to claim 1, wherein the processor is configured to determine, among one or more pages forming each of the plurality of digital documents, a page to be extracted as the predetermined page in accordance with a type of the search condition.

16. The information processing system according to claim 15, wherein the processor is configured to determine the page to be extracted as the predetermined page in accordance with whether the type of the search condition is a name of the digital documents, a creation date of the digital documents, a creator of the digital documents, or a character string included in the digital documents.

17. The information processing system according to claim 16, wherein the processor is configured to determine that a head page of each of the plurality of digital documents is to be extracted as the predetermined page if the type of the search condition is one of the name of the digital documents, the creation date of the digital documents, and the creator of the digital documents, and to determine that a page having a smallest page number among one or pages including the character string included in the digital documents is to be extracted as the predetermined page if the type of the search condition is the character string included in the digital documents.

18. A non-transitory computer readable medium storing a program causing a computer to execute a process, the process comprising:

extracting, among one or more pages forming each of a plurality of digital documents a predetermined page which is preset for each of the plurality of digital documents;

performing control to generate a virtual document comprising a set of the extracted predetermined pages of the respective digital documents;

performing control to generate a first image representing the virtual document, which comprises the set of the extracted predetermined pages of the respective digital documents and to display the first image on a display;

performing control, in response to a first input operation performed on the first image by a user, to display a second image, which represents the extracted predetermined pages, in an enlarged size on the display so that a display size of the second image becomes larger than a display size of the first image; and wherein the plurality of digital documents are obtained as results of conducting a search by using a specified search condition, wherein when the control to display the second image is performed, displaying, in addition to the second image, a button to move from the second image to a workspace where the digital document including the extracted predetermined page represented by the second image is stored, and in a case where the button is selected by the user, performing control to change a display from the second image to the workspace where the digital document including the extracted predetermined page represented by the second image is stored.

19. An information processing method comprising:

extracting, among one or more pages forming each of a plurality of digital documents a predetermined page which is preset for each of the plurality of digital documents;

performing control to generate a virtual document comprising a set of the extracted predetermined pages of the respective digital documents;

performing control to generate a first image representing the virtual document, which comprises the set of the extracted predetermined pages of the respective digital documents and to display the first image on a display;

performing control, in response to a first input operation performed on the first image by a user, to display a second image, which represents the extracted predetermined pages, in an enlarged size on the display so that a display size of the second image becomes larger than a display size of the first image, and wherein the plurality of digital documents are obtained as results of conducting a search by using a specified search condition, wherein when the control to display the second image is performed, displaying, in addition to the second image, a button to move from the second image to a workspace where the digital document including the extracted predetermined page represented by the second image is stored, and in a case where the button is selected by the user, performing control to change a display from the second image to the workspace where the digital document including the extracted predetermined page represented by the second image is stored.

* * * * *